US 8,311,059 B2

(12) United States Patent
Williams (10) Patent No.: US 8,311,059 B2
(45) Date of Patent: Nov. 13, 2012

(54) RECEIVE COALESCING AND AUTOMATIC ACKNOWLEDGE IN NETWORK INTERFACE CONTROLLER

(75) Inventor: James B. Williams, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 552 days.

(21) Appl. No.: 11/222,401

(22) Filed: Sep. 7, 2005

(65) Prior Publication Data

US 2007/0064737 A1 Mar. 22, 2007

(51) Int. Cl.
*H04J 3/16* (2006.01)
*H04J 3/22* (2006.01)

(52) U.S. Cl. ........................................ 370/469

(58) Field of Classification Search .................... 370/469
See application file for complete search history.

(56) References Cited

U.S. PATENT DOCUMENTS

| 6,744,765 | B1 * | 6/2004 | Dearth et al. | 370/394 |
|---|---|---|---|---|
| 6,907,042 | B1 * | 6/2005 | Oguchi | 370/412 |
| 2003/0056041 | A1 * | 3/2003 | Connor et al. | 710/58 |
| 2004/0095883 | A1 * | 5/2004 | Chu et al. | 370/235 |
| 2004/0258075 | A1 * | 12/2004 | Sidenblad et al. | 370/395.5 |
| 2005/0111355 | A1 * | 5/2005 | Plaks et al. | 370/229 |
| 2005/0147110 | A1 * | 7/2005 | Connor | 370/412 |
| 2005/0228896 | A1 * | 10/2005 | Nishida | 709/230 |
| 2006/0104303 | A1 * | 5/2006 | Makineni et al. | 370/463 |
| 2006/0221990 | A1 * | 10/2006 | Muller et al. | 370/412 |
| 2007/0022212 | A1 * | 1/2007 | Fan | 709/238 |
| 2007/0255866 | A1 * | 11/2007 | Aloni et al. | 710/52 |

OTHER PUBLICATIONS

Wallace Wadge, "Achieving Gigabit Performance on Programmable Ethernet Network Interface Cards," May 2001, University of Malta.*

* cited by examiner

*Primary Examiner* — Jae Y Lee
(74) *Attorney, Agent, or Firm* — Morrison & Foerster LLP (57) ABSTRACT

An apparatus and method is disclosed for reducing the computational overhead incurred by a host processor during packet processing and improving network performance by adding additional functionality to a Network Interface Controller (NIC). Under certain circumstances the NIC coalesces multiple receive packets into a single coalesced packet stored within a coalesce buffer in host memory. The coalesced packet includes an Ethernet header, a coalesced Internet Protocol (IP) header, a coalesced Transmission Control Protocol (TCP) header, and a coalesced TCP payload containing the TCP payloads of the multiple receive packets. By coalescing received packets into fewer larger coalesced packets within the host memory, the host software needed to process a receive packet will be invoked less often, meaning that less processor overhead is incurred in the host.

27 Claims, 4 Drawing Sheets

RECEIVE COALESCING AND AUTOMATIC ACKNOWLEDGE IN NETWORK INTERFACE CONTROLLER

FIELD OF THE INVENTION

This invention relates to the implementation of networking protocols in host computers, and more particularly, to the coalescing of multiple packets into a single larger packet and providing automatic acknowledgements for enabling efficient communications between a Network Interface Controller (NIC) and a host processor.

BACKGROUND OF THE INVENTION

Figure 1:
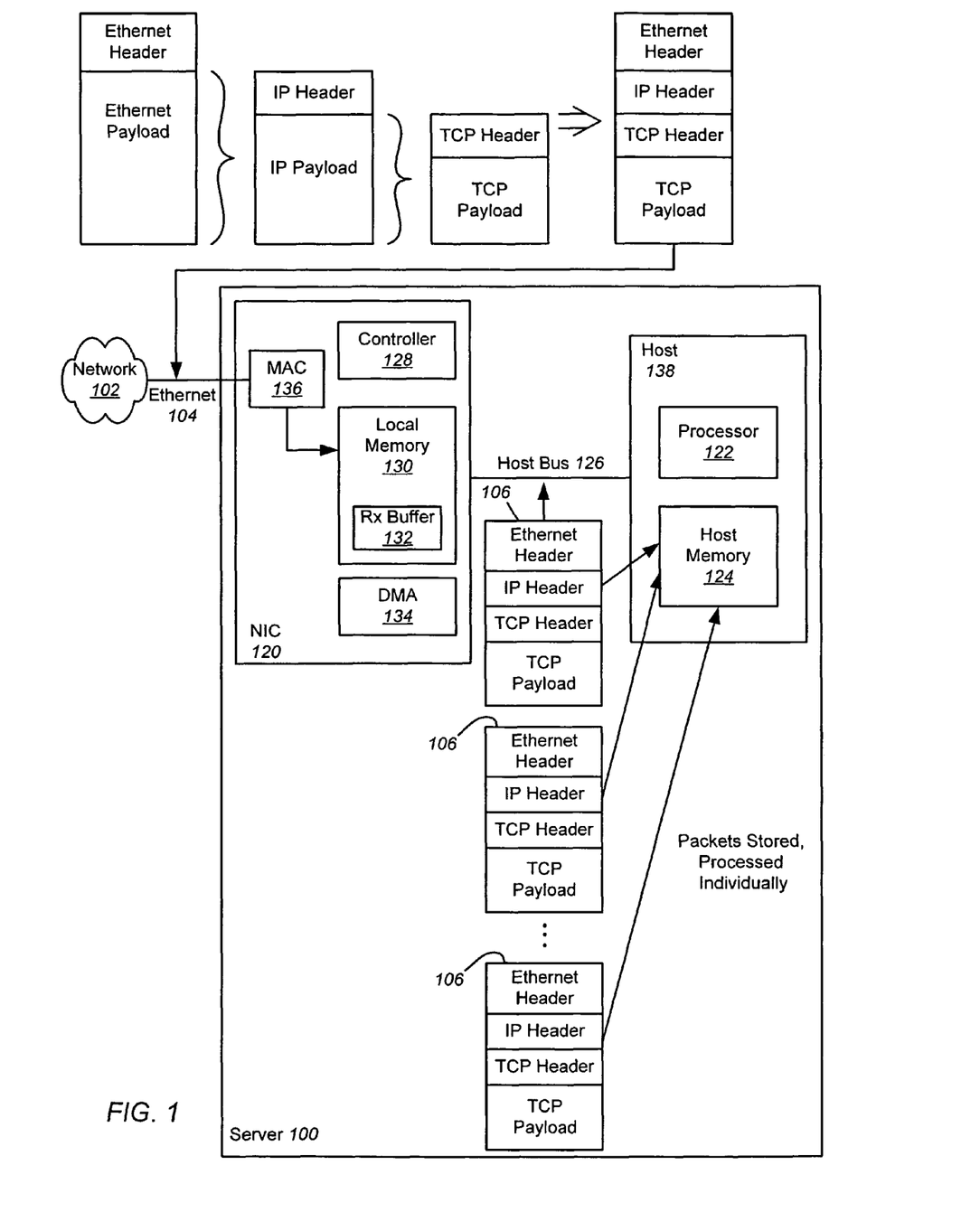
FIG. 1 is a block diagram of an exemplary conventional server connected to a network over a link implementing the Ethernet protocol.

Information is typically conveyed over conventional networks in packets. FIG. 1 illustrates a conventional server 100 connected to a network 102 over a link 104 implementing the Ethernet protocol. In FIG. 1, information is transferred in packets 106 comprised of an Ethernet header 108 and an Ethernet payload 110. The Ethernet payload 110 is effectively comprised of an Internet Protocol (IP) header 112 and an IP payload 114. IP is a general protocol that works over a range of different physical networks, and allows different networks to communicate, but it is unreliable and unordered because delivery of messages is not guaranteed, or messages may be delivered out of order. The IP payload 114 is effectively comprised of a Transmission Control Protocol (TCP) header 116 and a TCP payload 118. TCP runs on top of IP and provides reliability and ordering to the IP payload. The net result is a packet 106 comprised of an Ethernet header 108, an IP header 112, and a TCP header 116, and a TCP payload 118. The TCP/IP network protocol allows the transmission of data by breaking the transmitted data into segments, transmitting the segments in a series of packets 106, and then reassembling the segments at the receiving end.

In FIG. 1, the packets 106 are received in a NIC 120 within the server 100. The NIC 120 is typically connected to a host 138 over an internal host bus 126 such as a Peripheral Component Interconnect (PCI) bus. NICs 120 typically implement the Ethernet protocol over which TCP/IP protocol is often run. The host 138 includes a host processor 122 and host memory 124, among other things. A conventional NIC 120 may include a controller 128, local memory 130 including receive buffers 132 for storing packet data, a Direct Memory Access (DMA) engine 134 to transfer data between the local memory 130 and host memory 124, and a Media Access Control (MAC) unit 136 to implement the link level protocol of the network (e.g. the Ethernet protocol). When a packet 106 is received from the network 102, it is received by the MAC unit 136 and stored in receive buffers 132 in the local memory 130. The controller 128, which may include a processor capable of executing firmware or state machine logic, then initiates DMA transfers to send the packet 106 from local memory 130 to host memory 124, and notifies the host processor 122 when the packet has been stored in host memory 124.

Generally, hardware in the NIC 120 implements the low level protocol (e.g. the Ethernet protocol) and software executed by the host processor 122 implements the higher level protocols (e.g. IP and TCP). Every time a packet is received in host memory 124 and "delivered" to the host through a notification to the host processor 122, the host software must be invoked to handle the processing of TCP and IP. Although this networking model works well in many applications, there are some applications (e.g. using storage protocols such as Internet Small Computer System Interconnect (iSCSI) over TCP/IP to displace Fibre Channel (FC) in high end storage networking) where the performance of traditional networking is insufficient due to excessive computational overhead incurred by the host processor.

Conventional hardware solutions such as expanding the NIC to handle the processing of TCP and IP by including a TCP Offload Engine (TOE) are expensive and also require rewriting the host networking software. Therefore, there is a need to reduce the computational overhead incurred by the host processor during packet processing, while minimizing the impact to the host network stack.

SUMMARY OF THE INVENTION

Embodiments of the present invention are directed to reducing the computational overhead incurred by the host processor during packet processing and improving network performance by adding additional functionality to the NIC. In embodiments of the present invention, under certain circumstances the NIC coalesces multiple receive packets into a single coalesced packet stored within a coalesce buffer in host memory. The coalesced packet includes an Ethernet header, a coalesced IP header, a coalesced TCP header, and a coalesced TCP payload containing the TCP payloads of the multiple receive packets. By coalescing received packets into fewer larger coalesced packets within the host memory, the host software needed to process a receive packet will be invoked less often, meaning that less processor overhead is incurred in the host.

Receive packets can be coalesced only if they are from the same connection. Therefore, in order to implement receive coalescing, the NIC must read connection_info for each received packet and compare it to the connection_info stored in the NIC. Connection_info is a six-tuple containing (1) the Ethertype contained in Ethernet MAC header, (2) the source_IP_address contained in the IP header, (3) the destination_IP_address contained in the IP header, (4) the protocol designation contained in the IP header, (5) the source_port contained in the TCP header, and (6) the destination_port contained in the TCP header. When a packet is received in the NIC, the NIC will extract the connection_info from the packet and compare it to the connection_info stored in local memory. The connection_info in the received packet must match a connection_info context stored in the local memory in order for the packet to be accepted as part of the current connection. If there is a match, the packet can be further processed with respect to coalescing. Note that the NIC typically supports multiple offloaded connections, and thus the connection_info in the received packet is checked against a lost of offloaded connections. If it matches any of these, the packet can be further processed for coalescing.

Receive packets can be coalesced only if coalescing is enabled in the NIC. Therefore, when a packet is received in the NIC, a receive_coalesce_enable bit is read in the NIC. The receive_coalesce_enable bit must be asserted in order for receive coalescing to continue.

Receive packets can be coalesced only if the packets are received with their sequence numbers in order, without gaps. To confirm that packets are being received in order, the NIC must read the sequence number of each received packet and compare it to sequence information stored in the NIC. If the sequence number of the received packet is equal to a next_expected_sequence value, then the packet is the next one in sequence, and coalescing is enabled. If the sequence number of the received packet is less than or greater than the next_expected_sequence value, the packet is delivered to the host by itself in the conventional manner, while any partially coalesced packet may be sent to the host.

In addition to the sequence information, other connection state information must be utilized in order for coalescing and automatic acknowledgements to be implemented. This connection state information includes a host_buffer_pointer that points to the coalesce buffer in host memory into which the coalesced packet is being written, and a host_buffer_offset representing the offset into the coalesce buffer at which next packet payload should be written. The host_buffer_offset is used in conjunction with the host_buffer_pointer to determine the location in the coalesce buffer at which the next packet payload should be written.

In TCP, at least every other packet must be acknowledged to the source of the packet so that the sending device can determine if any packet has been dropped, and re-send the dropped packet if necessary. However, by coalescing multiple packets before delivering them to the host, the host will not be able to acknowledge in a timely fashion every other received packet. Therefore, in embodiments of the present invention, under certain circumstances the NIC will automatically acknowledge received data by sending a TCP acknowledge packet for at least every other received packet. By having the NIC acknowledge received packets, the host is freed from the work involved in issuing such acknowledgements.

To implement automatic acknowledgements, an acknowledge_next bit indicates to the NIC whether the next packet received should be acknowledged. Because every second packet should be acknowledged, the acknowledge_next bit will toggle state on each received packet. A last_received_ack field indicates the value of the acknowledge field of the last received packet. The acknowledge field is comprised of multiple bits (e.g. 32) and represents the sequence number of the acknowledge packet that will be transmitted from the NIC back to the source device.

If, after considering the received packet, the connection_info, sequence information, and other connection state information stored in the NIC, the NIC determines that a packet can be coalesced, the various headers and TCP payload of the coalesced packet must be constructed in host memory. The coalesced TCP payload is constructed by concatenating the payloads of each packet being coalesced.

The NIC will continue coalescing received packets into a single coalesced packet in host memory until that coalesced packet is delivered to the host. After delivering the coalesced packet, the NIC will start coalescing newly received packets into a new coalesced packet in host memory.

According to one of several embodiments, one or more computer readable storage media include a computer program which, when executed by one or more processors in an Input/Output Controller (IOC), assists in delivering a plurality of received packets from the IOC to a host for processing by causing the one or more processors to perform the steps of determining that the plurality of received packets are part of a same connection, determining that the plurality of received packets were received in order and without gaps, automatically acknowledging at least every other received packet in the IOC without host intervention, and sending commands to the host for updating a single coalesced packet stored in the host with header and payload information from the plurality of received packets if the plurality of received packets are part of the same connection and were received in order and without gaps.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

It should further be understood that although embodiments of the present invention are described herein in terms of NICs for purposes of illustration only, embodiments of the present invention are applicable to any input/output controller that delivers packets to a host for processing.

Figure 2:
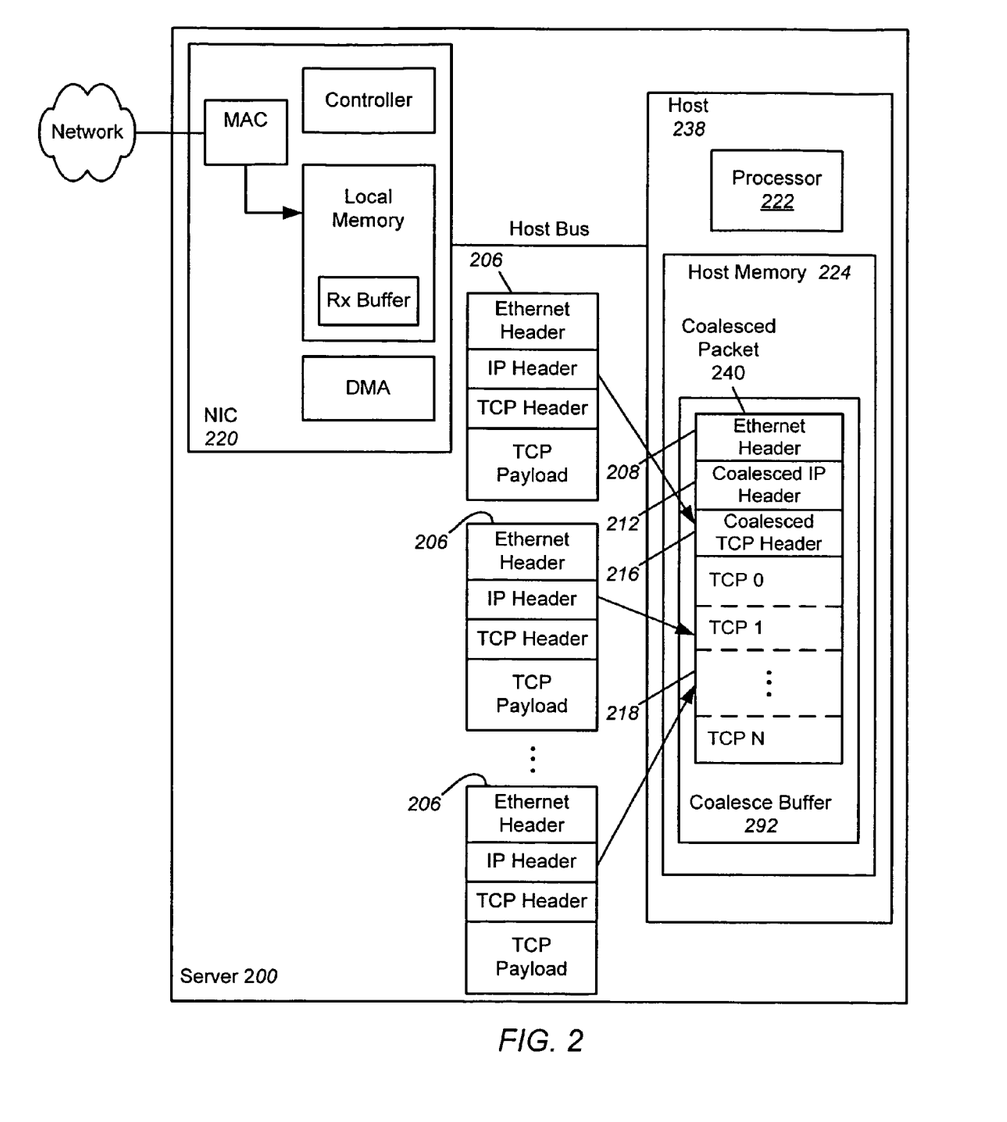
FIG. 2 is a block diagram of an exemplary server including a NIC and a host for implementing receive packet coalescing and automatic acknowledgement according to embodiments of the present invention.

FIG. 2 illustrates a server 200 including a NIC 220 and a host 238 for implementing receive packet coalescing and automatic acknowledgement according to embodiments of the present invention. Embodiments of the present invention reduce the computational overhead incurred by the host processor 222 during packet processing and improve network performance by adding additional functionality to the NIC 220. In embodiments of the present invention, under certain circumstances the NIC 220 coalesces multiple receive packets 206 into a single coalesced packet 240 stored within a coalesce buffer 292 in host memory 224. The coalesced packet 240 includes an Ethernet header 208, a coalesced IP header 212, a coalesced TCP header 216, and a coalesced TCP payload 218 containing the TCP payloads of the multiple receive packets.

As mentioned above, every time a packet is received in host memory 224, the host software must be invoked to handle the processing of TCP and IP. By coalescing received packets into fewer larger coalesced packets within the host memory 224, the host software will be invoked less often. This reduces the work needed to be done by the host 238 because much of this work is proportional to the number of packets processed, meaning that less processor overhead is incurred in the host.

In embodiments of the present invention, the host 238 must send a command to the NIC 220 to start coalescing. A vendor-specific coalesce command may be sent from the host 238 to the NIC 220 over a bus such as a PCI bus. However, in order for received packets 206 to be coalesced, (1) the packets must be part of the same connection, and (2) the connection state must be examined. The connection state determines whether coalescing is enabled for that connection and whether the packets are being received in sequence, without any gaps, and includes other information needed to successfully create a coalesced packet in host memory. The command to begin coalescing will therefore contain connection information (referred to herein as connection_info) and the next sequence number expected by the host.

With regard to the connection information, it should be understood that TCP is a connection-oriented protocol. Thus, many connections may be open at the same time, with the same host, but for different applications. Therefore, as noted above, packets can be coalesced only if they are from the same connection. In order to implement receive coalescing, the NIC 220 must read the connection_info for each received packet and compare it to the connection_info stored in the NIC.

Figure 3:
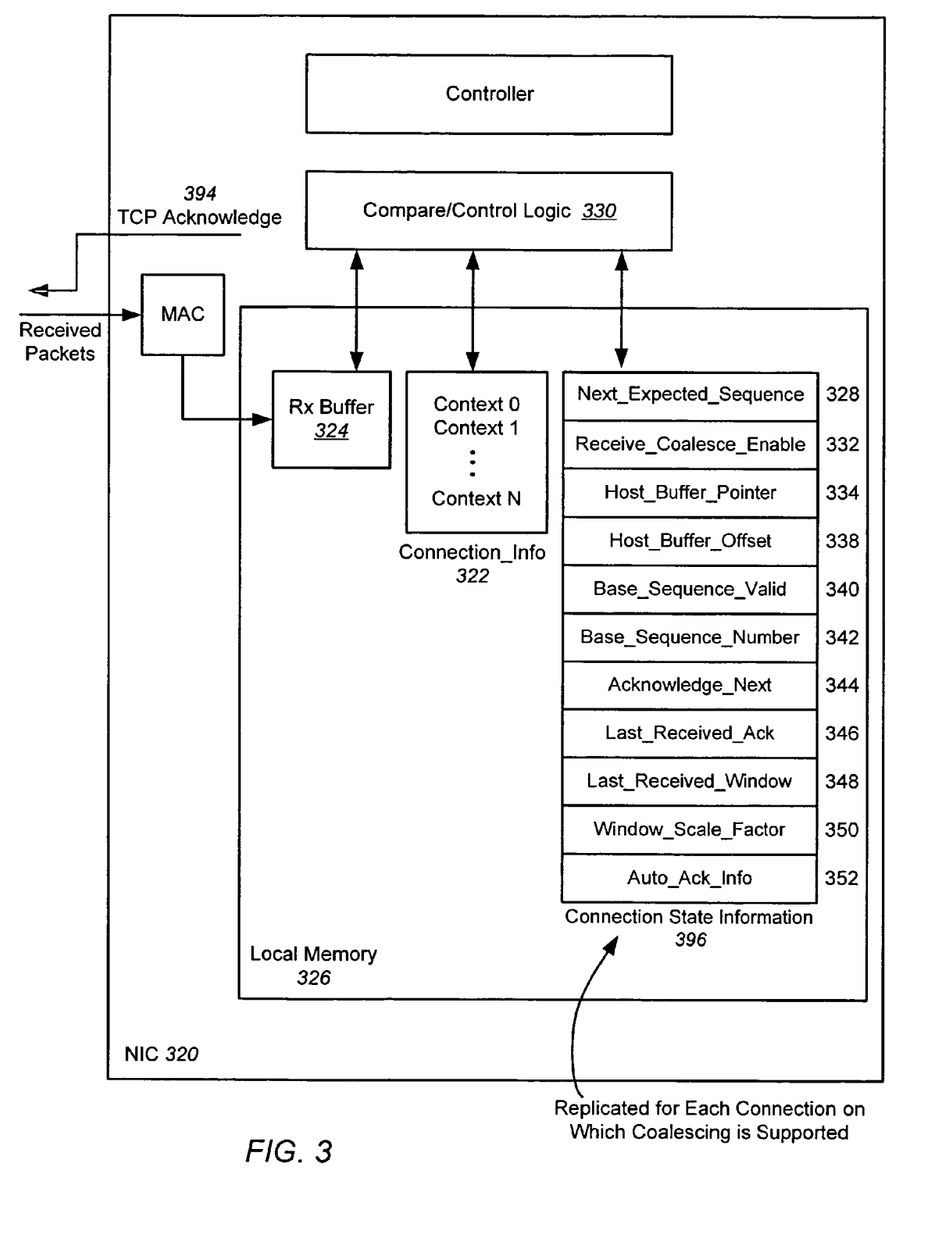
FIG. 3 is a block diagram of an exemplary NIC containing connection information and connection state information needed for determining whether received packets can be coalesced and performing the coalescing according to embodiments of the present invention.

Connection_info is a six-tuple containing (1) the Ethertype contained in Ethernet MAC header, (2) the source_IP_address contained in the IP header, (3) the destination_IP_address contained in the IP header, (4) the protocol designation contained in the IP header, (5) the source_port contained in the TCP header, and (6) the destination_port contained in the TCP header. As illustrated in FIG. 3, the NIC 320 will implement a number of contexts, each with its own connection_info, and maintain a table in local memory 326 with the connection_info 322 for each context. When a packet is received in the NIC 320 and stored in a receive buffer 324 in local memory 326, the NIC will extract the connection_info from the packet and compare it to the connection_info 322 stored in local memory using compare/control logic 330. The connection_info in the received packet must match one of the connection_info contexts stored in the local memory 320 in order for the packet to be accepted as part of the current connection. If there is a match, the packet can be further processed with respect to coalescing. If a packet for a different connection is received, the coalescing command fails, and the packet is transmitted by itself in the conventional manner.

With regard to whether coalescing is enabled in the NIC 320, a receive_coalesce_enable bit 332 is stored in local memory 326 in the NIC, which indicates whether receive coalescing and automatic acknowledgement is in effect. There is one receive_coalesce_enable bit for each connection supported. (Note that this is generally true for all connection state information.) When a packet is received in the NIC 320, the receive_coalesce_enable bit 332 is read in the NIC. The receive_coalesce_enable bit 332 must be asserted in order for receive coalescing to continue. In addition, if any IP options or IP fragmentation are found in the IP header of a received packet, coalescing is precluded and the packet will be processed in the conventional manner.

With regard to the sequence of the received packets, each byte in a stream of bytes in a TCP connection is identified by a unique sequence number that is incremented by one for each successive byte in the stream. Each packet contains multiple bytes, and the sequence number of the first byte in the packet is designated as the sequence number for that packet. Therefore, the sequence numbers of consecutive packets are not consecutive, but rather are separated by the number of bytes in a packet (i.e. the payload size). To confirm that packets are being received in order, the NIC 320 must read the sequence number of each received packet and compare it to the sequence information stored in the NIC. Embodiments of the present invention generally coalesce packets that are received in order and without any gaps, and will not coalesce packets that are out of order or that create gaps. Out-of-order packets or packets that create gaps will instead be processed in the conventional manner.

The sequence information includes a next_expected_sequence value 328 stored in the local memory 326, which is computed in the NIC 320 to be the sequence number of the last received packet on the connection plus the size of the last payload. The sequence information also includes a base_sequence_valid bit 340 and a base_sequence_number 342 stored in local memory 326. When asserted, the base_sequence_valid bit 340 indicates that all packets associated with the connection with a sequence number greater than the base_sequence_number 342 have been received in order.

When a packet is received in the NIC 320, its connection information is first checked against a list of supported connections. If there is a match, the connection context information is accessed for that connection, which includes the next_expected_sequence and base_sequence_number values for that connection. The sequence number of the packet is extracted from the packet and compared to the next_expected_sequence value 328 and base_sequence_number 342 for that connection in compare/control logic 330. If the sequence number of the received packet is equal to the next_expected_sequence value 328, then base_sequence_valid 340 is asserted and base_sequence_number 342 is unchanged, and coalescing is enabled. If the sequence number of the received packet is less than the next_expected_sequence value 328, or if base_sequence_valid 340 is de-asserted, then an out of order packet has arrived that the host has not yet seen. In this case, base_sequence_valid 340 is de-asserted, if necessary, base_sequence_number 342 is left unchanged, and coalescing is not enabled. If the sequence number of the received packet is greater than the next_expected_sequence value 328, then a gap is detected in the sequence. In this case, base_sequence_valid 340 is asserted, base_sequence_number 342 is set to the sequence number of the received packet, and coalescing is not enabled. In either of these two cases where a packet is received out of order or with a gap detected in the sequence, the packet is transmitted by itself in the conventional manner, while any partially coalesced packet may be sent to the host.

In addition to the sequence information, other connection state information 396 stored in the local memory 326 must be utilized in order for coalescing and automatic acknowledgements to be implemented. This connection state information 396 includes a host_buffer_pointer 334 stored in local memory 326, which points to the coalesce buffer in host memory into which the coalesced packet is being written. This pointer is used when writing a packet payload into the coalesce buffer 336. A host_buffer_offset 338 is also stored in local memory 326, representing the offset into the coalesce buffer at which next packet payload should be written. The host_buffer_offset 338 is used in conjunction with the host_buffer_pointer 234 to determine the location in the coalesce buffer at which the next packet payload should be written.

In TCP, at least every other packet must be acknowledged to the source of the packet so that the sending device can determine if any packet has been dropped, and re-send the dropped packet if necessary. However, by coalescing multiple packets before delivering them to the host, the host will not be able to acknowledge in a timely fashion every other received packet. Therefore, in embodiments of the present invention, under certain circumstances the NIC 320 will automatically acknowledge received data by sending a TCP acknowledge packet 394 for at least, every other received packet. By having the NIC 320 acknowledge received packets, the host is freed from the work involved in issuing such acknowledgements.

To implement automatic acknowledgements, acknowledgement information including an acknowledge_next bit 344 is stored as part of the connection_state information 396 in local memory 326, which indicates to the NIC 320 whether the next packet received should be acknowledged. Because every second packet should be acknowledged, the acknowledge_next bit 344 will toggle state on each received packet. A last_received_ack field 346 is also stored in local memory 326, which indicates the value of the acknowledge field of the last received packet. The acknowledge field is comprised of multiple bits (e.g. 32) and represents the sequence number of the acknowledge packet that will be transmitted from the NIC back to the source device.

Certain acknowledgement information must be stored in local memory 326 so that when acknowledgement packets are sent back to the source device, the acknowledgement packets are sent with this acknowledgement information. This acknowledgement information includes an auto_ack_info field 352 stored in local memory 326, which includes information that the NIC needs to send automatic acknowledge packets. Specifically, the auto_ack_info field 352 contains information needed to set the sequence and window fields in the acknowledgement packet.

A last_received_window field 348 is also stored in local memory 326, which is used to generate an indication of how much data is allowed to be sent back to the source device from the host. This information is contained in a window field in the received packets, and the last_received_window field 348 stores the value of the window field of the last packet received. A window_scale_factor field 350 is also stored in local memory 326, which is a TCP parameter negotiated at connection setup. The window_scale_factor field 350 is a value that is multiplied by the last_received_window field 348 to compute the true value of the window.

If, after considering the received packet, the connection_info 322, sequence information, and other connection state information 396 stored in the NIC 320, the NIC determines that a packet can be coalesced, the various headers and TCP payload of the coalesced packet must be constructed in host memory.

Figure 4:
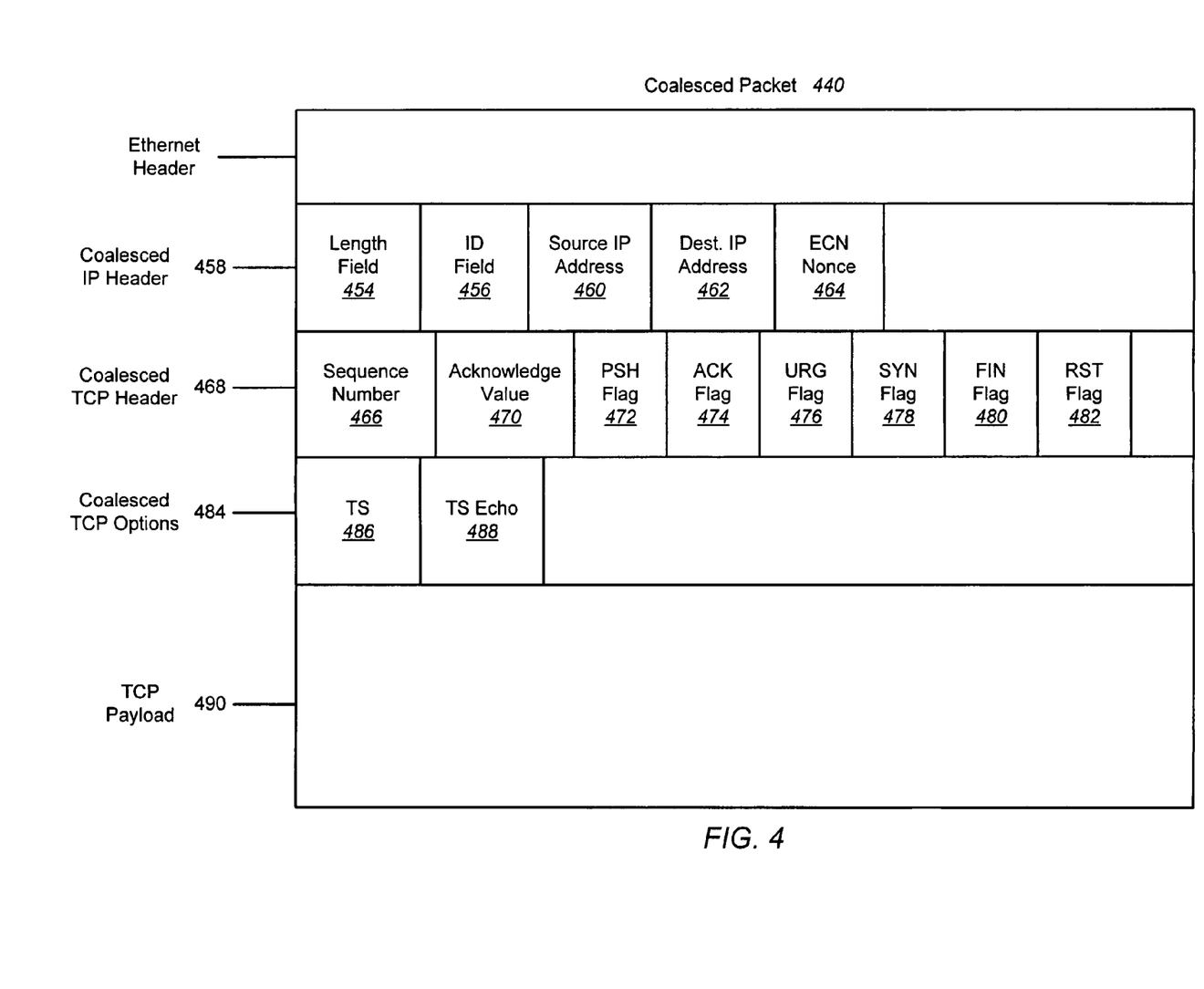
FIG. 4 is an illustration of an exemplary coalesced packet stored in host memory according to embodiments of the present invention.

FIG. 4 is an illustration of an exemplary coalesced packet 440 stored in host memory according to embodiments of the present invention. The coalesced IP header 458 in the coalesced packet 440 is comprised of several fields. The length field 454 stores the payload length of the current coalesced packet. When a new packet to be coalesced is received, the length field of the payload of the received packet is added to the length field 454 of the coalesced IP header 458 of the coalesced packet 440, and the updated length is stored back into the length field 454. This addition may be performed either in hardware in the compare/control logic of the NIC, or in firmware executed within the NIC. Note that a running length is stored in the connection context (local to the NIC). For each packet processed, the context for the connection with which the packet is associated must be accessed. Some values in this context will be read, modified, and written back to the context. The information for the coalesced header may be written to host memory only once at the completion of the coalesced packet.

The source IP address and destination IP address for each packet being coalesced must be identical, because all of these packets are part of the same connection. Therefore, when a packet is received, the source IP address, destination IP address and protocol stored in its IP header are compared to and must match the source IP address 460 and destination IP address 462 and protocol stored in the coalesced IP header 458. In addition, if Explicit Congestion Notification (ECN) nonces are being used as defined in the standards document RFC-3540 (which describes how Internet switches indicate congestion by setting defined code points in the IP header), the nonce in the received packet is added to the sum of the nonces stored in the coalesced IP header 458, and the result is stored back into the coalesced IP header 458. This addition may be performed either in hardware in the compare/control logic in the NIC, or in firmware executed within the NIC. Packets with congestion indicated codepoint may not be coalesced.

The coalesced TCP header 468 is constructed by setting the sequence number of the first packet to be coalesced as the sequence number 466 of the coalesced TCP header 468, and setting the acknowledge value of the last packet to be coalesced as the acknowledge value 470 of the coalesced TCP header 468. The PuSH (PSH) flags of each of the packets being coalesced are logically ORed to form the PSH flag 472 of the coalesced packet 468, which indicates, if asserted, that the data should be pushed up to the next layer above TCP. Because the ACK flag in each of the packets to be coalesced must be asserted, the ACK flag 474 is also asserted in the coalesced TCP header 468. Because the URGent (URG), SYNchronize (SYN) (indicates packet that begins a connection), FINish or FINal (FIN) (indicates packet that ends a connection), and ReSeT (RST) flags in each of the packets to be coalesced must be de-asserted, the URG 476, SYN 478, FIN 480, and RST 482 flags are also de-asserted in the coalesced TCP header 468. If any of these flags are asserted in the received packet, coalescing will not be performed on that packet.

The coalesced TCP options header 484, an optional header, is constructed by setting the time stamp (TS) of the last coalesced packet as the TS 486 of the coalesced TCP options header 484, and setting the TS echo of the earliest packet received with the same acknowledge value as the last packet received as the TS echo 488 of the coalesced TCP options header 484. Note that no other options may be present in a coalesced packet. The Selective ACKnowledgement (SACK) option in particular precludes coalescing that packet.

The coalesced TCP payload 490 is constructed by concatenating the payloads of each packet being coalesced.

The NIC will stop coalescing received packets if (1) the host commands it to stop, (2) a packet is received out of sequence, (3) a packet is received with a TCP option other than the TS option, (4) a packet is received with TCP flag bit URG, SYN, FIN, or RST asserted, or the ACK flag deasserted, or (5) ECN is enabled and congestion is indicated.

The NIC will continue coalescing received packets into a single coalesced packet in host memory until that coalesced packet is delivered to the host. After delivering the coalesced packet, the NIC will start coalescing newly received packets into a new coalesced packet in host memory. A coalesced packet will be delivered to the host under the following conditions, some of which may be optional and are enabled or disabled by the host: (1) the host coalesce buffer into which the combined packet is being assembled fills up, (2) coalescing is disabled for any of the above reasons, (3) a TCP packet is receive with the PSH flag asserted (which means that the data has to be delivered now), (4) the time since the last coalesced packet was received exceeds some configured value (a timeout occurs), (5) the NIC determines that a Protocol Data Unit (PDU) of a higher level protocol (such as iSCSI) running inside the TCP payload has completed, or (6) the host requests delivery of the partially complete coalesced packet.

When receive coalescing is enabled, the host will generally not be notified until the combined packet is delivered. However, the host may optionally want to be notified explicitly if new data is acknowledged by the remote end. In other words, if the host has sent data to a destination system, and the destination system sends an acknowledgement back to the host, either in a separate packet or embedded in the TCP header of a data packet, the host may want to be notified immediately of this acknowledgement. When the acknowledgement is sent in a separate packet, coalescing may or may not be terminated and the partially coalesced packet delivered to the host. If the acknowledgement is embedded in the TCP header of a data packet, some other indication may be provided to the host that the acknowledgement was received while coalescing continues.

The host may also want to be notified immediately if a new window has been extended by the remote end. In other words, if a destination device sends a packet to the host with the window field in the TCP header indicating that the amount of data that the host can send to that destination device has been changed, the host may want to be identified immediately. Again, if the new window information is sent in a separate packet, coalescing may or may not be terminated and the partially coalesced packet delivered to the host. If the new window information is embedded in the TCP header of a data packet, some other indication may be provided to the host that new window information was received while coalescing continues. Similarly, the host may also want to be notified immediately if a duplicate acknowledge for the same data is received. A duplicate acknowledge is a packet containing no data, acknowledging no new data, and not expanding the window. It is typically an indication that the remote end has received out of sequence data.

Embodiments of the present invention may be described in the general context of computer-readable or processor-executable instructions. Such instructions may include computer programs, applications, coding, modules, objects, interfaces, components, data structures, frame organizations and/or preamble content, etc., which perform and/or enable the performance of particular tasks and/or implement particular data structures. Also, the computer-readable or processor-executable instructions may be located in separate storage media, executed by different processors, and/or propagated over or extant on various transmission media. Moreover, the computer-readable or processor-executable instructions may be embodied as software, firmware, hardware, fixed logic circuitry, some combination thereof, and so forth.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for delivering a plurality of received packets from an input/output controller (IOC) to a host for processing, comprising:
    storing the plurality of received packets in a local memory of the IOC;
    determining that the plurality of received packets are part of a same Transmission Control Protocol (TCP) connection;
    determining that the plurality of received packets were received in order and without gaps;
    combining headers and payloads of the plurality of received packets into a single coalesced packet if the plurality of received packets are part of the same TCP connection and were received in order and without gaps;
    automatically acknowledging at least every other received packet to be combined in the single coalesced packet by sending a TCP acknowledge packet from the IOC to a source of the received packet without host intervention, wherein the host includes a host processor and a host memory; and
    delivering the single coalesced packet to the host for processing after said automatically acknowledging at least every other received packet to be combined in the single coalesced packet.

2. The method as recited in claim 1, further comprising determining that the plurality of received packets are part of the same TCP connection by verifying that connection information contained in each of the plurality of received packets matches the connection information stored in the IOC.

3. The method as recited in claim 2, wherein the connection information includes an Ethertype, a source Internet Protocol (IP) address, a destination IP address, a protocol designation, a source port identifier, and a destination port identifier.

4. The method as recited in claim 1, further comprising determining if coalescing is enabled in the IOC by reading a receive coalesce enable bit.

5. The method as recited in claim 1, further comprising determining that the plurality of received packets were received in order and without gaps by verifying that a sequence number contained in each of the plurality of received packets matches a next expected sequence value stored in the IOC.

6. The method as recited in claim 1, further comprising reading a host buffer pointer and a host buffer offset to determine a location for storing a received packet to be combined into the single coalesced packet.

7. The method as recited in claim 1, further comprising reading an acknowledge next bit to determine whether to acknowledge a received packet to be combined into the single coalesced packet.

8. The method as recited in claim 1, each packet in the plurality of packets including a first protocol header, a second protocol header, a third protocol header, and a third protocol payload, the method further comprising:
    combining the second protocol headers of the plurality of packets into a single coalesced second protocol header in the coalesced packet;
    combining the third protocol headers of the plurality of packets into a single coalesced third protocol header in the coalesced packet; and
    combining the third protocol payloads of the plurality of packets into a single coalesced third protocol payload in the coalesced packet.

9. The method as recited in claim 8, further comprising:
    storing a sum of third protocol payload lengths for each packet in the plurality of packets into a length field in the coalesced second protocol header.

10. The method as recited in claim 8, wherein the first protocol header is an Ethernet header, the second protocol header is an Internet Protocol (IP) header, the third protocol header is a Transmission Control Protocol (TCP) header, and the third protocol payload is a TCP payload.

11. The method as recited in claim 1, wherein the input/output controller is a Network Interface Controller (NIC).

12. The method as recited in claim 1, further comprising stopping the combining of the headers and payloads of the plurality of received packets into the single coalesced packet if the host sends a stop coalesce command to the IOC or if a packet is received out of sequence.

13. The method as recited in claim 1, further comprising delivering the single coalesced packet to the host for processing when the single coalesced packet fills up a host buffer in a host memory within which the single coalesced packet is being stored.

14. An input/output controller (IOC) for delivering a plurality of received packets to a host for processing, comprising:
    a local memory for storing received packets, connection information and connection state information;
    a controller and compare/control logic coupled to the local memory and configured for comparing connection information located in the plurality of received packets to the connection information stored in the local memory to determine whether the plurality of received packets are part of a same Transmission Control Protocol (TCP) connection, comparing sequence numbers located in the plurality of received packets to next expected sequence values stored in the local memory as part of the connection state information to determine whether the plurality of received packets were received in order and without gaps, combining headers and payloads of the plurality of received packets into a single coalesced packet if the plurality of received packets are part of the same TCP connection and were received in order and without gaps, automatically acknowledging at least every other received packet to be combined in the single coalesced packet in a host memory by sending a TCP acknowledge packet from the IOC to a source of the received packet without host intervention, wherein the host includes a host processor and the host memory, inducing updating the single coalesced packet stored in the host memory with the headers and payloads from the plurality of received packets if the plurality of received packets are part of the same TCP connection and were received in order and without gaps, and delivering the single coalesced packet to the host for processing after said automatically acknowledging at least every other received packet to be combined in the single coalesced packet.

15. The IOC as recited in claim 14, wherein the connection information stored in the local memory includes an Ethertype, a source Internet Protocol (IP) address, a destination IP address, a protocol designation, a source port identifier, and a destination port identifier.

16. The IOC as recited in claim 14, the local memory for storing a receive coalesce enable bit, the controller and compare/control logic further configured for:

determining if coalescing is enabled in the IOC by reading the receive coalesce enable bit; and inducing updating the single coalesced packet stored in the host memory with the headers and payloads from the plurality of received packets only if coalescing is enabled in the IOC.

17. The IOC as recited in claim 14, the local memory for storing a host buffer pointer and a host buffer offset, the controller and compare/control logic further configured for reading the host buffer pointer and the host buffer offset to determine a location for storing a received packet to be combined into the single coalesced packet.

18. The IOC as recited in claim 14, the local memory for storing an acknowledge next bit, the controller and compare/control logic further configured for reading the acknowledge next bit to determine whether to acknowledge a received packet to be combined into the single coalesced packet.

19. The IOC as recited in claim 14, each packet in the plurality of received packets including a first protocol header, a second protocol header, a third protocol header, and a third protocol payload, the controller and compare/control logic further configured for inducing updating the single coalesced packet stored in the host memory by:

combining the second protocol headers of the plurality of packets into a single coalesced second protocol header in the coalesced packet;

combining the third protocol headers of the plurality of packets into a single coalesced third protocol header in the coalesced packet; and combining the third protocol payloads of the plurality of packets into a single coalesced third protocol payload in the coalesced packet.

20. The IOC as recited in claim 19, the controller and compare/control logic further configured for storing a sum of third protocol payload lengths for each packet in the plurality of packets into a length field in the coalesced second protocol header.

21. The IOC as recited in claim 19, wherein the first protocol header is an Ethernet header, the second protocol header is an Internet Protocol (IP) header, the third protocol header is a Transmission Control Protocol (TCP) header, and the third protocol payload is a TCP payload.

22. The IOC as recited in claim 14, wherein the input/output controller is a Network Interface Controller (NIC).

23. The IOC as recited in claim 14, the controller and compare/control logic further configured for stopping combining of the headers and payloads of the plurality of received packets into a single coalesced packet if the host sends a stop coalesce command to the IOC or if a packet is received out of sequence.

24. The IOC as recited in claim 14, the controller and compare/control logic further configured for delivering the single coalesced packet to the host for processing when the single coalesced packet fills up a host buffer in the host memory within which the single coalesced packet is being stored.

25. A server comprising an input/output controller (IOC) for delivering a plurality of received packets to a host for processing, the IOC comprising:

a local memory for storing received packets, connection information and connection state information;

a controller and compare/control logic coupled to the local memory and configured for comparing connection information located in the plurality of received packets to the connection information stored in the local memory to determine whether the plurality of received packets are part of a same Transmission Control Protocol (TCP) connection, comparing sequence numbers located in the plurality of received packets to next expected sequence values stored in the local memory as part of the connection state information to determine whether the plurality of received packets were received in order and without gaps, combining headers and payloads of the plurality of received packets into a single coalesced packet if the plurality of received packets are part of the same TCP connection and were received in order and without gaps, automatically acknowledging at least every other received packet to be combined in the single coalesced packet in a host memory by sending a TCP acknowledge packet from the IOC to a source of the received packet without host intervention, wherein the host includes a host processor and the host memory, inducing updating the single coalesced packet stored in the host memory with the headers and payloads from the plurality of received packets if the plurality of received packets are part of the same TCP connection and were received in order and without gaps, and delivering the single coalesced packet to the host for processing after said automatically acknowledging at least every other received packet to be combined in the single coalesced packet.

26. A Storage Area Network (SAN) comprising a server, the server comprising an input/output controller (IOC) for delivering a plurality of received packets to a host for processing, the IOC comprising:
- a local memory for storing received packets, connection information and connection state information;
- a controller and compare/control logic coupled to the local memory and configured for
  - comparing connection information located in the plurality of received packets to the connection information stored in the local memory to determine whether the plurality of received packets are part of a same Transmission Control Protocol (TCP) connection,
  - comparing sequence numbers located in the plurality of received packets to next expected sequence values stored in the local memory as part of the connection state information to determine whether the plurality of received packets were received in order and without gaps,
  - combining headers and payloads of the plurality of received packets into a single coalesced packet if the plurality of received packets are part of the same TCP connection and were received in order and without gaps,
  - automatically acknowledging at least every other received packet to be combined in the single coalesced packet in a host memory by sending a TCP acknowledge packet from the IOC to a source of the received packet without host intervention, wherein the host includes a host processor and the host memory,
  - inducing updating the single coalesced packet stored in the host memory with the headers and payloads from the plurality of received packets if the plurality of received packets are part of the same TCP connection and were received in order and without gaps, and
  - delivering the single coalesced packet to the host for processing after said automatically acknowledging at least every other received packet to be combined in the single coalesced packet.

27. One or more non-transitory computer readable storage media including a computer program which, when executed by one or more processors in an Input/Output Controller (IOC), assists in delivering a plurality of received packets from the IOC to a host for processing by causing the one or more processors to perform the steps of:
- storing the plurality of received packets in a local memory of the IOC;
- determining that the plurality of received packets are part of a same Transmission Control Protocol (TCP) connection;
- determining that the plurality of received packets were received in order and without gaps;
- combining headers and payloads of the plurality of received packets into a single coalesced packet if the plurality of received packets are part of the same TCP connection and were received in order and without gaps;
- automatically acknowledging at least every other received packet to be combined in the single coalesced packet in a host memory by sending a TCP acknowledge packet from the IOC to a source of the received packet without host intervention, wherein the host includes a host processor and a host memory;
- inducing updating the single coalesced packet stored in the host memory with the headers and payloads from the plurality of received packets if the plurality of received packets are part of the same TCP connection and were received in order and without gaps; and
- delivering the single coalesced packet to the host for processing after said automatically acknowledging at least every other received packet to be combined in the single coalesced packet.

* * * * *